United States Patent [19]

Grabow

[11] 3,782,225

[45] Jan. 1, 1974

[54] TRANSMISSION ESPECIALLY FOR MOTOR VEHICLES
[75] Inventor: Fritz Grabow, Muhlweg, Germany
[73] Assignee: Daimler-Benz Aktiengesellschaft, Stuttgart, Germany
[22] Filed: Apr. 2, 1971
[21] Appl. No.: 130,612

[30] Foreign Application Priority Data
Apr. 3, 1970 Germany............... P 20 15 945.9

[52] U.S. Cl.................................. 74/720, 74/733
[51] Int. Cl............................................ F16h 47/02
[58] Field of Search.................. 74/720, 733, 687

[56] References Cited
UNITED STATES PATENTS
2,618,988  11/1952  Woydt.................... 74/733
2,891,419  6/1959   Badalini................. 74/720 X
2,962,915  12/1960  Wiggermann.............. 74/733 X
3,095,757  7/1963   Thoma................... 74/687
3,204,486  9/1965   DeLalio................. 74/687
3,286,541  11/1966  Dearnley et al.......... 74/687 X
3,580,107  5/1971   Orshansky, Jr........... 74/687
3,593,596  7/1971   Race et al.............. 74/720

Primary Examiner—Charles J. Myhre
Assistant Examiner—Thomas C. Perry
Attorney—Craig, Antonelli & Hill

[57] ABSTRACT

A transmission, especially for motor vehicles, which includes an infinitely variable converter adjoining an engine shaft and several pairs of meshing gears following the converter which are adapted to be selectively engaged or disengaged by way of shifting clutches, whereby one shifting clutch is adapted to connect the engine shaft with a pair of meshing gears, while actually selectively engaged, and the converter, such as a hydrostatic converter, is adapted to be internally uncoupled.

18 Claims, 1 Drawing Figure

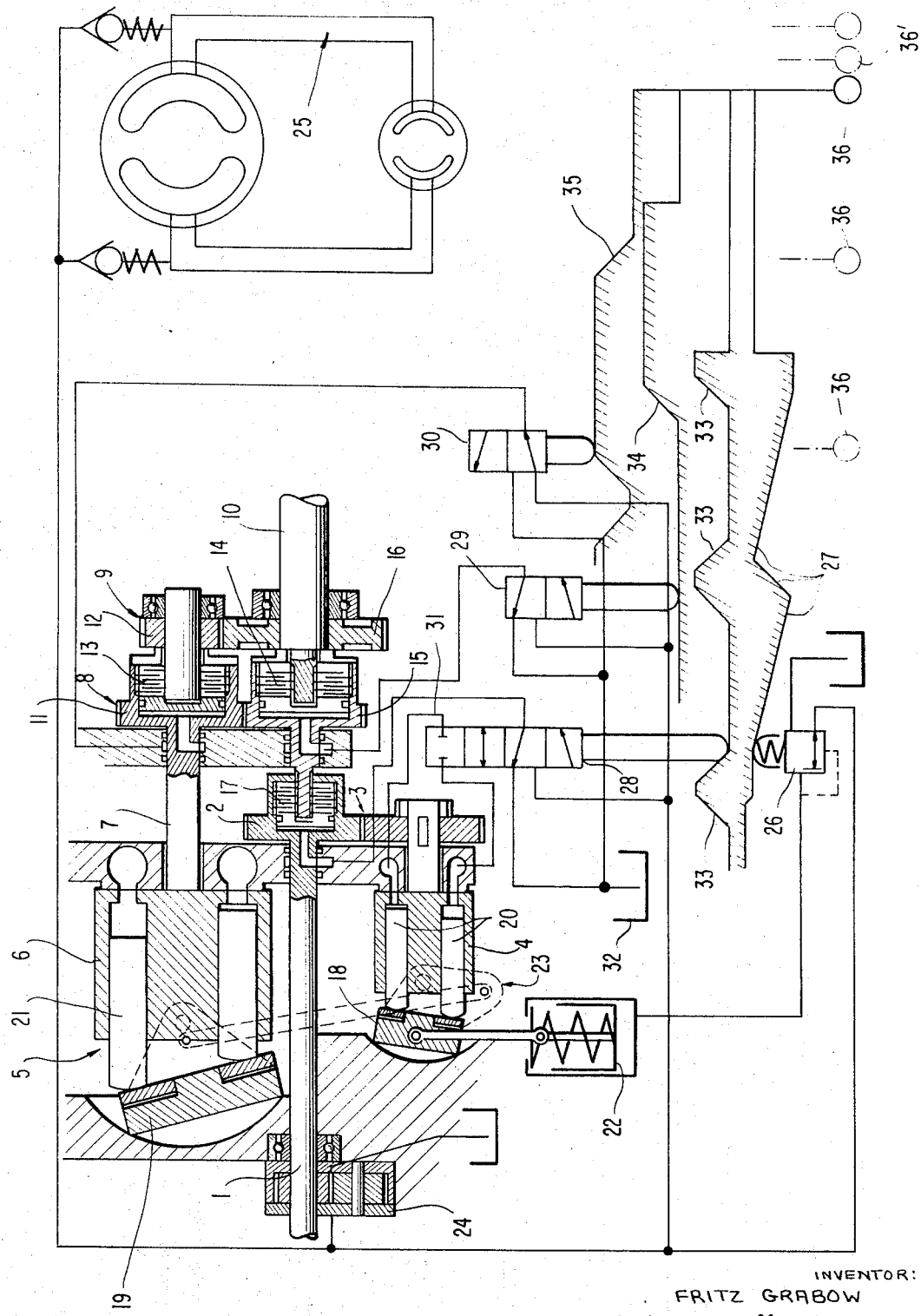

TRANSMISSION ESPECIALLY FOR MOTOR VEHICLES

The present invention relates to a transmission, especially for motor vehicles, which includes an infinitely variable torque converter adjoining the engine shaft and gear pairs following the converter, which are adapted to be selectively engaged or disengaged by way of shifting clutches.

Transmissions of this type are normally intended for heavy vehicles and train engines and should allow variable converting speed reductions from 1:1 to 1:16. However, this is not possible with the known converters alone because, for example, a hydrostatic converter which consists of a pump and of a motor, permits only a maximum conversion of about 1:4 unless an excessively large hydrostatic motor or also several motors are used.

In order to enable nonetheless a larger converting range, i.e., a large range of changes in transmission ratios, it is known to equip such a transmission with a hydrostatic converter which is adapted to be selectively connected in its output with several transmission ratios or speed reduction steps consisting of pairs of gear wheels. With this known type of construction the torque conversion range is passed through several times, for which purpose the converting ranges are selected by mechanical shifting means accompanied with an interruption in traction force.

The present invention is concerned with the task to provide a transmission of the aforementioned type which has high variable speed reductions that can be passed through without interruption in tractive force. The present invention essentially consists in that a shifting clutch is provided, by means of which the engine shaft is adapted to be coupled with the engaged transmission ratio or gear wheel step in by-passing relationship to the converter, and in that the converter includes a mechanism for the internal disengagement or uncoupling thereof. The possibility is created thereby that the converter, after it has once passed through or traversed its entire converter range speed-reduced by one gear step or transmission ratio, can once more traverse or pass through its entire converter range in another gear step or transmission ratio without the occurrence of an interruption in tractive force because during the shifting of the converter and of the gear pair, the engine shaft can be coupled directly with the transmission output shaft while simultaneously an internal uncoupling of the converter is undertaken, in which condition the converter can be returned to its original position without the transmission of torque by the converter during such shifting operation.

An advantageous construction of the present invention is obtained if a hydrostatic converter is provided whose circulatory system is adapted to be short-circuited within the area of its pump. Such a hydrostatic converter permits in a simple manner an internal uncoupling during which its converting range can be shifted without the transmission of torque by the converter during such shifting operation.

A simple embodiment of this invention, in which the converter passes through its converting range twice, is obtained if the infinitely variable converter is connected with the engine shaft by way of a pair of gears, whereby the output of the converter is adjoined by two selectively engageable gear wheel pairs, and if the engine shaft is connected with one of the gear wheel pairs by way of a shifting clutch. In order to achieve that with this type of construction, the coupling of the engine shaft with the output takes place without shocks, it is advantageous if the transmission ratio of the gear wheel pair connected to the input of the converter corresponds inversely to the transmission ratio of the gear wheel pair adapted to be coupled or clutched to the engine shaft. In order to increase the efficiency, it is appropriate if in the direct speed the engine shaft is adapted to be coupled with the output shaft and the converter is adapted to be uncoupled. Efficiency losses in the converter are avoided thereby in the direct speed.

According to a further feature of the present invention a hydraulic system may be provided for the control of the hydrostatic converter and for the shifting of the shifting clutches, whose control slide valve and shifting valves are actuatable by means of a common shifting installation. It is thereby advantageous if the shifting installation includes a control cam for the control slide valve of the hydrostatic converter and shifting cams for the shifting valves which are offset relative thereto at distances coordinated to the control positions of the converter. An accurate coordination of the individual shifting operations can be achieved thereby in a simple manner.

These and other objects, features and advantages of the present invention will become more obvious from the following description when taken in conjunction with the accompanying drawing, which shows, for purposes of illustration only, one embodiment in accordance with the present invention, and wherein:

The single FIGURE is a schematic cross-sectional view through a transmission of the present invention and a schematic diagram of the hydraulic system enabling the shifting operations according to the present invention.

Referring now to the single FIGURE of the drawing, an engine shaft 1 extends from an engine (not shown) to the transmission, while the gear 2 of the pair of gear wheels generally designated by reference numeral 3 is arranged on the shaft 1 for rotation in unison therewith. A hydrostatic pump 4 of a hydrostatic converter generally designated by reference numeral 5 and of conventional construction is driven from the engine shaft 1 by means of the gear wheel pair 3. The hydrostatic converter 5 further includes a hydrostatic motor 6 of conventional construction whose output shaft 7 is connected with two-gear transmission ratios generally designated by reference numerals 8 and 9 and each consisting of a pair of gear wheels, which are operatively connected with the output shaft 10 of the transmission connected itself with the driven axle (not shown). A hydraulically engageable shifting clutch 13 is operatively arranged between the gear wheel 11 of the gear pair 8, mounted on the output shaft 7 of the hydrostatic motor 6, and the gear wheel 12 of the gear pair 9, arranged coaxially thereto. A similar shifting clutch 14 is provided between the two other coaxially disposed gear wheels 15 and 16 of the two-gear pairs 8 and 9.

The gear wheel 15 of the first gear pair 8, which is disposed coaxially to the transmission output shaft 10, is additionally adapted to be connected with the gear wheel 2 by way of a hydraulically engageable shifting clutch 17.

The hydrostatic pump 4 and the hydrostatic motor 6 of the hydrostatic converter 5, which are hydraulically connected with each other in a conventional manner, are provided with adjusting discs or swash plates 18 and 19 guided in circular tracks whereby the swash plates 18 and 19, for purposes of achieving a control, are adjustable and delimit the stroke of the pistons 20 and 21 of the pump 4 and of the motor 6, respectively. The adjustment of the discs or plates 18 and 19 takes place by means of a hydraulically actuatable piston 22 and a corresponding constructed adjusting linkage generally designated by reference numeral 23 and of any conventional construction.

Pressure oil is supplied to the hydraulic system from a gear pump 24 arranged on the engine shaft 1, which pressure oil may possibly be held at a constant level by means of a conventional reservoir or storage device generally designated by reference numeral 25. The hydraulic system includes a control slide valve member 26 of conventional construction and illustrated only schematically, by means of which the spring-loaded piston 22 of the adjusting installation of the hydrostatic converter 5 is adapted to be loaded or acted upon with the pressure of the hydraulic medium. The adjustment of the control slide valve member 26 takes place by way of a control cam 27 of a shifting installation. Additional shifting valves 28, 29 and 30, shown only schematically, are provided in the hydraulic system, of which the shifting valve 28 is constructed in such a manner that it is able to short-circuit by means of one valve section the circulatory system 31 of the hydrostatic converter 5 within the area of the pump 4 thereby effectively uncoupling the converter 5 internally. This shifting valve 28 additionally serves by means of another valve section for the purpose of engaging or relieving (disengaging) of the shifting clutch 17 arranged between engine shaft 1 and the gear pair 8. In the illustrated position this shifting valve 28 relieves the shifting clutch 17, i.e., causes the same to become disengaged, since the clutch 17 is able to discharge the hydraulic actuating medium into the tank 32. The actuation of the shifting valve 28 takes place by way of several shifting cams 33 of the shifting installation.

Each of the shifting clutches 13 and 14 arranged between respective gears 11, 12 and 15, 16 of the gear pairs 8 and 9, includes its own shifting valve 29 and 30, respectively, which in one position thereof conducts pressure oil to the shifting clutches 13 and 14 and in the other position thereof connect the lines leading to the shifting clutches 13 and 14 with the collecting tank 32 so that the shifting clutches 13 and 14 can discharge, i.e., can empty the cylinder spaces thereof to become disengaged. The actuation of the two shifting valves 29 and 30 also take place by way of shifting cams 34 and 35 of the common shifting installation. The shifting clutches 13, 14 and 17 are of conventional construction and include conventional actuating pistons, disengaging springs, etc., while shifting valves 28, 29 and 30 are also of conventional construction.

The shifting installation can be displaced, for example, manually by means of a shifting knob 36 or the like from the zero position 36' indicated in dot and dash lines from the right toward the left, as viewed in the drawing for purposes of the engagement of the individual shifting ranges. In such zero position the shifting valve 28 is actuated by the peak of the first shifting cam 33 to uncouple the converter 5 internally by the short-circuit of the circulation 31 and to adjusting mechanism 22, 23 to maximum torque conversion. In the illustrated shifting position of the shifting installation the shifting valve 30 of the upper shifting clutch 13, as viewed in the drawing, is so adjusted that the shifting clutch 13 is connected with the pressure feed and is, therefore, engaged. The other shifting valves 28 and 29 are so adjusted that the shifting clutches 14 and 17 are opened or disengaged and the normal circulation of the hydrostatic converter 5 from its pump 4 to its motor 6 exists. As a result thereof, converter 5 is adjusted by valve 26 and adjusting mechanism 22, 23 to maximum conversion producing together with the speed reduction of gear pair 9 the maximum overall speed reduction. By a displacement of the shifting installation toward the left, only the control slide valve member 26 is gradually adjusted by means of the control cam 27 which then gradually effects by way of the hydraulic piston 22 the infinitely variable control of the hydrostatic converter 5. This is readily achieved by a suitable conventional construction of valve 26 to produce the desired gradually varying throttling effect by interaction with control cam 27. The control cam 27 is so dimensioned that at its end, i.e., with maximum depressing of the slide member 26 at the peak of control cam 27, the speed reduction ratio of 1:1 of the hydrostatic converter 5 is attained. Within this range the gear pair 9 constructed as largest speed reduction, for example, with a ratio of 1:3.5 is operable which together with the converting range, for example, of 1:3.5, of the hydrostatic converter 5 enables the largest overall speed reduction.

When the complete converting range of the hydrostatic converter 5 is traversed in connection with gear pair 9, a shifting has to take place in which the other gear pair 8 will be rendered operable after the converter is returned to its initial position, i.e., into its position of largest torque conversion or speed reduction. This is realized by actuation of the control slide valve member 26 and of the shifting valves 28, 29 and 30, by means of the control cam 27 and by means of the shifting cams 33, 34 and 35 arranged at corresponding distances on the shifting installation. As soon as the hydrostatic converter 5 has reached its transmission ratio of 1:1, the shifting clutch 17 between the engine shaft 1 and the gear wheel pair 8 is engaged by displacement of the shifting valve 28 by means of the control cam 33, while at the same time the circulation 31 of the hydrostatic converter 5 is short-circuited within the area of the pump 4, resulting in an internal uncoupling of converter 5. Since the hydrostatic converter 5 is then unable to transmit any torque, the torque of the engine shaft 1 is transmitted in this shifting position to the output shaft 10 exclusively by the shifting clutch 17 by way of the gear pair 8, by way of the shifting clutch 13 and by way of the next gear pair 9. In order to enable in that connection a shock-free engagement of the shifting clutch 17, it must be assured by an appropriate selection of the speed reduction of the gear pair 8 that the rotational speed of the engine shaft 1 exists in the shifting clutch 17 on both sides thereof. Simultaneously therewith, the control slide valve member 26 is adjusted by a corresponding configuration and construction of the control cam 27 in such a manner that the hydrostatic converter 5 assumes the position which corresponds to its maximum speed reduction. If the shifting installation is further displaced toward the left, then the shifting clutch 17 is opened again and the short-circuit of the circulation 31 of the hydrostatic converter 5 is discontinued. At the same time, the shifting valve 29 is actuated by the shifting cam 34 in such a manner that the shifting clutch 14 is engaged. Simultaneously therewith, the shifting valve 30 is opened by means of a corresponding shifting cam 35 of the shifting installation so that the other shifting clutch 13 is disengaged. The shifting to the next shifting range therefore takes place without interruption of the tractive force between the engine and the driven wheels.

In the now assumed shifting position, the speed reduction ratio of the hydrostatic converter is controlled by the control cam 27 of the shifting installation. Since the speed reduction ratios of the gear pair 3 connected in the input of the hydrostatic converter 5 and of the gear pair 8 in the output thereof are inversely equal for reasons of the rotational speed equalization to the engine shaft 1 during shifting, the existing speed reduction ratio of the hydrostatic converter 5 serves directly and exclusively as controlling transmission speed reduction.

After a further displacement of the shifting installation toward the left, the speed reduction ratio of the hydrostatic converter 5 becomes 1:1 so that the direct speed is reached. In this position, the shifting valve 28 is actuated by a shifting cam 33 of the shifting installation and the clutch 17 adjoining the engine shaft 1 is engaged. Simultaneously therewith the hydrostatic converter 5 is disengaged or uncoupled in the manner described above. A direct transmission of the torque from the engine shaft 1 to the output shaft 10 then takes place by way of the shifting clutches 17 and 14.

While I have shown and described only one embodiment of the present invention, it is understood that the latter is not limited thereto, but is susceptible of numerous changes and modifications as known to those skilled in the art. For example, in lieu of the illustrated hydrostatic converter 5, also all infinitely variable transmission can be used which permit an internal uncoupling or disengagement, such as, for instance, friction wheel transmissions. It is only necessary to ensure that a by-passing of the infinitely variable transmission is possible while at the same time the infinitely variable transmission can be so shifted that it does not transmit any torque during such shifting operation.

Additionally, a reverse speed may be readily obtained by moving the shifting knob from its zero or idling position 36' toward the right as viewed in the drawing to the new position indicated in dash and dot lines, whereby the slewing direction of either pump 4 or motor 5 is reversed by conventional means.

Since all clutches 13, 14 and 17 are friction clutches permitting slippages, the simultaneous engagement and disengagement of some of these clutches or of clutch 17 and of hydraulic converter 5 takes place with a certain overlap. Consequently, any other slip clutches of known construction may also be used in place of clutches 13, 14 and 17.

Hence, I do not wish to be limited to the details shown and described herein, but intend to cover all such changes and modifications as are encompassed by the scope of the appended claims.

I claim:

1. A steplessly adjustable transmission comprising: an input shaft, an output shaft, gear means operatively associated with said input shaft and said output shaft for providing at least two mechanical transmission ratios, a first selectively engageable means operatively associated with said gear means for selectively providing one of said at least two mechanical transmission ratios, a second selectively engageable means operatively associated with said gear means for selectively providing a second of said at least two transmission ratios, infinitely variable transmission means having an input and an output, said infinitely variable transmission means input being operatively connected with said input shaft and said infinitely variable transmission means output being operatively connected with at least one of said gear means, said gear means providing at least two power paths between said infinitely variable transmission means and said output shaft, disabling means operatively connected to said infinitely variable transmission means for selectively disabling the transmission of torque therethrough, a third selectively engageable means effectively connected between said input shaft and one of said at least two power paths for enabling said infinitely variable transmission means to be shifted from a first end position to a second end position, said first and second positions defining the maximum range of said infinitely variable transmission means, and a multi-position control means operatively associated with said disabling means and said first, second and third selectively engageable means for controlling same, said control means in a first position enabling said first selectively engageable means to engage said gear means providing one of said at least two mechanical ratios throughout said maximum range of said infinitely variable transmission means from said first end position to said second end position, said control means in a second position enabling said infinitely variable transmission means to return to said first end position by simultaneously engaging said third selectively engageable means and said disabling means and thereafter disengaging said first selectively engageable means, said third selectively engageable means and said disabling means and engaging said second selectively engageable means whereby said infinitely variable transmission means can again be shifted substantially over said maximum range with said second of said at least two transmission ratios engaged without interruption of the tractive force in the transmission.

2. A steplessly adjustable transmission according to claim 1, further including means for selectively shifting said infinitely variable transmission means over said maximum range to thereby effect any desired transmission ratio possible by said infinitely variable transmission means with every mechanical transmission ratio provided by said gear means.

3. A transmission according to claim 1, characterized in that said disabling means includes means for internally uncoupling said infinitely variable transmission means.

4. A transmission according to claim 3, characterized in that said infinitely variable transmission means an infinitely variable hydrostatic converter.

5. A transmission according to claim 1 wherein at least some of said selectively engageable means are shifting clutch means.

6. A transmission according to claim 5, characterized in that said infinitely variable transmission means includes a hydrostatic converter means with pump and motor means whose circulation is adapted to be short-circuited by said disabling means within the area of its pump means.

7. A transmission according to claim 6 wherein said input of said hydrostatic converter means is operatively connected with said input shaft by way of a pair of gear means, said output of said hydrostatic converter means is adapted to be connected with two selectively engageable pairs of said gear means providing said at least two power paths and wherein said first and second selectively engageable means include shifting clutch means.

8. A transmission according to claim 7, wherein the transmission ratio of said pair of gear means connected with said input shaft is inversely equal to the transmission ratio of one of said two selectively engageable pairs of gear means.

9. A transmission according to claim 8, wherein said third selectively engageable means includes a shifting clutch means and said disabling means includes a means for uncoupling said converter means.

10. A transmission according to claim 9, wherein a hydraulic system is provided in said control means for the control of said hydrostatic converter means and for the shifting of each of said shifting clutch means, said control means includes a control slide valve means, shifting valve means, and a common shifting installation.

11. A transmission according to claim 10 wherein said common shifting installation includes a control cam means for said control slide valve means and shifting cam means for the shifting valve means which are spaced relative thereto at distances coordinated to the respective control positions of the converter means.

12. A transmission according to claim 11, characterized in that said disabling means includes means for internally uncoupling said hydrostatic converter means.

13. A transmission according to claim 5, wherein said input of said infinitely variable transmission means is operatively connected with said input shaft by way of a pair of gear means, said output of said infinitely variable transmission means is adapted to be connected with two selectively engageable pairs of said gear means providing said at least two power paths, and wherein said first and second selectively engageable means include shifting clutch means.

14. A transmission according to claim 13, wherein the transmission ratio of said pair of gear means connected with said input shaft is inversely equal to the transmission ratio of one of said two selectively engageable pairs of gear means.

15. A transmission according to claim 5, wherein said third selectively engageable means includes a shifting clutch means and said disabling means includes a means for uncoupling said converter means.

16. A transmission according to claim 5, wherein a hydraulic system is provided in the control means for the control of said converter means and for the shifting of each of said shifting clutch means, said control means includes a control slide valve means, shifting valve means, and a common shifting installation.

17. A transmission according to claim 16, wherein said common shifting installation includes a control cam means for said control slide valve means and shifting cam means for the shifting valve means which are spaced relative thereto at distances coordinated to the respective control positions of the converter means.

18. A transmission according to claim 17, characterized in that said infinitely variable transmission means includes a hydrostatic converter means with pump and motor means whose circulation is adapted to be short-circuited by said disabling means within the area of its pump means.

* * * * *